US007283753B2

(12) United States Patent
Giles et al.

(10) Patent No.: US 7,283,753 B2
(45) Date of Patent: Oct. 16, 2007

(54) SYSTEM AND METHOD FOR WDM COMMUNICATION WITH INTERLEAVING OF OPTICAL SIGNALS FOR EFFICIENT WAVELENGTH UTILIZATION

(75) Inventors: Randy Clinton Giles, Whippany, NJ (US); Debasis Mitra, Summit, NJ (US); Iraj Saniee, New Providence, NJ (US); Indra Widjaja, Florham Park, NJ (US); Martin Zirngibl, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 731 days.

(21) Appl. No.: 10/426,388

(22) Filed: Apr. 30, 2003

(65) Prior Publication Data

US 2004/0218922 A1   Nov. 4, 2004

(51) Int. Cl.
*H04B 10/00* (2006.01)
(52) U.S. Cl. .................... 398/168; 398/75; 398/78; 398/71
(58) Field of Classification Search ............ 398/68–73, 398/168, 75, 78
See application file for complete search history.

(56) References Cited

U.S. PATENT DOCUMENTS

| 6,735,393 | B1 * | 5/2004 | Zouganeli ............... 398/48 |
| 2005/0036785 | A1 * | 2/2005 | Tervonen et al. ......... 398/49 |

OTHER PUBLICATIONS

Micheal s. Borella, et al, "Efficient Scheduling of Nonuniform Packet Traffic in a WDM/TDM Local Lightwave Network with Arbitrary Transceiver Tuning Latencies," *Fourteenth Annual Joint Conference of the IEEE Computer and Communications Societies*, Boston/Los Alamitos, (Apr. 2-6, 1995) vol. 3, Conf. 14, pp. 129-137.

Joseph A. Bannister, et al, "Topological Design of the Wavelength-Division Optical Network," *Multiple Facets of Integration*, San Francisco, (Jun. 3-7, 1990), vol. 3, Conf. 9, pp. 1005-1013.

M. Ajmone Marsan, et al, "On the Capacity of MAC Protocols for All-Optical WDM Multi-Rings with Tunable Transmitters and Fixed Receivers," *Networking the Next Generation, Proceedings of IEEE Infocom 1996*, San Francisco, vol. 3, Conf. 15 (Mar. 24, 1996), pp. 1206-1216.

Lisong Xu, et al, "A Simulation Study of Optical Burst Switching and Access Protocols for WDM Ring Networks," *Computer Networks, Elsevier Science Publishers B.V.*, Amsterdam, NL, vol. 41, No. 2, (Feb. 5, 2003), pp. 143-160.

European Search Report.

* cited by examiner

*Primary Examiner*—Leslie Pascal
(74) *Attorney, Agent, or Firm*—M. I. Finston

(57) ABSTRACT

In a system and method of optical communication, optical signals are generated in multiple wavelength channels. Each optical signal is passively transported from an origination node of a network to a destination node. The destination node is determined by the signal wavelength. For at least some signals, the passive transport includes transport through a branch point of the network, such that the signal wavelength determines the output branch through which the signal is routed. In certain embodiments, signals are generated according to a schedule devised to substantially prevent the concurrent arrival, at the same destination node, of signals having the same wavelength but coming from different origination nodes.

6 Claims, 6 Drawing Sheets

SYSTEM AND METHOD FOR WDM COMMUNICATION WITH INTERLEAVING OF OPTICAL SIGNALS FOR EFFICIENT WAVELENGTH UTILIZATION

CROSS-REFERENCE TO RELATED PATENT APPLICATIONS

U.S. patent application Ser. No. 10/411,039, filed Apr. 10, 2003 by R. C. Giles et al. under the title, "Optical Network With Subwavelength Grooming," commonly assigned herewith, discloses certain subject matter which is common hereto.

U.S. patent application Ser. No. 10/426,389, filed Apr. 30, 2003 by K. Kumaran et al. under the title, "Method of Scheduling Bursts of Data for Transmission in a Communication Network," commonly assigned herewith, discloses certain subject matter which is common hereto.

FIELD OF THE INVENTION

The invention relates to WDM optical networks of the kind in which signals from various origins are optically groomed in order to use the channel capacity on links in a cost effective manner.

ART BACKGROUND

In one well-known architecture for an all-optical WDM network, each demand between an origin node and a destination node gets a dedicated wavelength channel that is unique on all of the links that make up the end-to-end path between that origin-destination node pair. Optical transport through such a network can be relatively simple, because cross-connection is carried out solely in the optical domain. However, the cost of network elements for such a network is relatively high, because wavelength channels are used inefficiently in general, and because network elements must be provided for relatively many wavelengths—roughly the square of the number of nodes of the network that are able to originate and receive transmissions.

In some cases, particularly in core networks, networks of this type may be economically viable if most of the wavelength channels are utilized to a substantial fraction of their full bandwidth capacities. However, it will often happen that the typical end-to-end demand fills only a small fraction of the total bandwidth available in a wavelength channel. In such cases, the economic viability of this type of network tends to suffer.

Various multiplexing techniques can be used to increase the utilization of specified wavelength channels on specified links of the network. In the technique known as traffic grooming, for example, disparate traffic streams routed through one or more common links are electronically multiplexed at their first common node and transported as an aggregate signal on a single wavelength channel. The aggregate signal is demultiplexed when a downstream common node is reached at or near which the streams diverge.

Although useful, traffic grooming tends to increase the equipment cost for the network, because it calls for optical-to-electronic conversion at the crossconnects, and the cross-connects will generally need relatively many inputs and outputs; i.e., they must have enough granularity to perform the necessary multiplexing and demultiplexing functions. Thus, the designer of a traffic-grooming network will generally be faced with a tradeoff between efficiency and cost.

Another approach for utilizing wavelength channels more efficiently is provided by optical burst switching (OBS). In OBS, optical signals are switched from input ports to output ports of an optical cross-connect on a per-burst basis. In other words, wavelengths are established between endpoints only for a short duration and switched at intermediate nodes. One drawback of OBS is that in commercially viable networks, the optical signals will need to have switching times on the order of several microseconds or less. Little or no commercially available switching technology is able to achieve such speeds. Moreover, OBS does not scale well to large cross-connects.

Yet another disadvantage of known grooming approaches, generally, is that they involve additional network layers that increase the number of switching types and adaptation functions. As a consequence, these added functionalities tend to increase the overall network cost.

A new scheme for all-optical transmission on ring networks which overcomes some of the problems described above has been described in U.S. patent application Ser. No. 10/411,039, "Optical Network With Subwavelength Grooming," cited above. However, there still remains a need to overcome the above problems in the context of a mesh network having at least one branch point.

In particular, then, there remains a need for a grooming approach in mesh networks having branch points that reduces the number of wavelength channels without electronic cross-connect, and that can be implemented with commercially available or emerging technology.

SUMMARY OF THE INVENTION

U.S. Pat. No. 10/411,039, "Optical Network With Subwavelength Grooming," cited above, describes a new scheme for all-optical transmission on ring networks. We refer to this scheme as a TDM-WDM ring. In the TDM-WDM ring, a specific wavelength channel or set of channels is assigned to each destination node. Origin nodes transmit intermittently through, e.g., tunable lasers to each of various destination nodes. Each transmission to a given destination node is made in one assigned wavelength channel regardless of the node at which the transmission originated.

We have developed a network architecture which makes it possible to enjoy the advantages of the TDM-WDM ring in the context of a mesh network having at least one branch point. In this context, a node occupies a "branch point" of a network if the node has two or more output ports, each directed to a different downstream node. Included as special cases of such networks are, e.g., star networks and hubbed networks. We refer to our new architecture as Time-Domain Interleaved Networking (TWIN).

In our new architecture, routing from each given origin to each given destination is determined by the wavelength assignments and by a pre-assigned graph for each assigned wavelength, referred to as a "tree," which specifies the sequence of links to be traversed from each origin node to the destination node assigned that wavelength. The trees, in turn, are advantageously implemented by wavelength-selective cross-connects (WSCCs), particularly those that merge common input wavelengths onto a common output fiber. Especially advantageous in this regard are WSCCs that can be implemented using 1×K switches.

Wavelength assignments and trees are subject to modification as indicated, e.g., by changing patterns of demand. However, such modifications will typically take place over periods of time much greater than an optical switching time—typically minutes, hours, days, or even longer periods. In this regard, a typical optical switching time will be the switching time of a tunable laser.

To prevent transmissions from disparate origins to a common destination from colliding, the transmissions from each origin node are advantageously packaged into sequences of limited length, referred to herein as optical bursts. The bursts are scheduled across the network in such a way that collisions are avoided.

Importantly, optical bursts in our architecture are passively transported from their origination to their destination nodes. By "passively transported" is meant that the routing is achieved through inherent physical properties of the bursts themselves, without any change in state of the hardware elements responsible for the routing.

BRIEF DESCRIPTION OF THE DRAWING

FIG. 6 is a schematic drawing of an illustrative wavelength-selective cross-connect (WSCC) with full merging of wavelengths.

DETAILED DESCRIPTION

Figure 1:
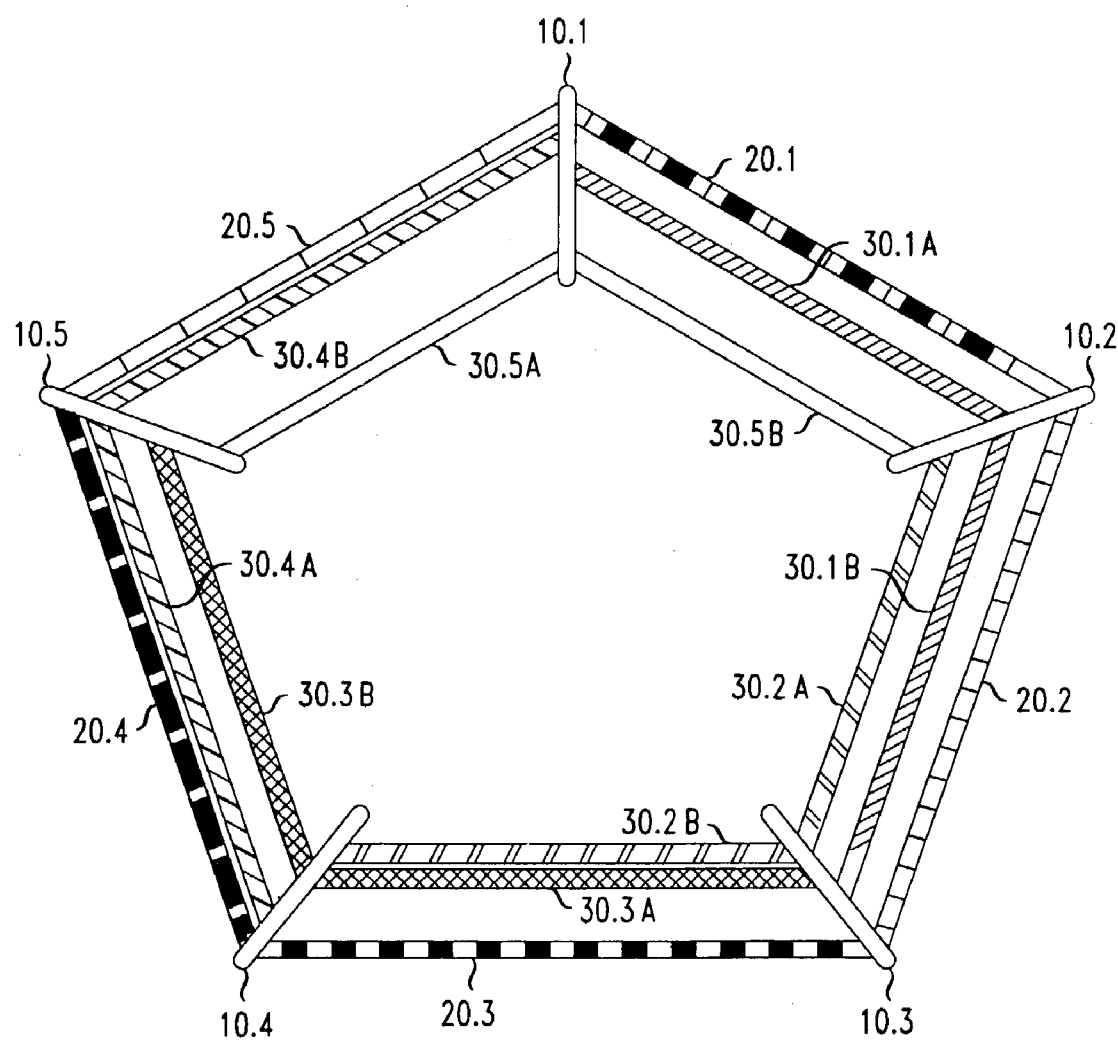
FIG. 1 is a conceptual drawing of a WDM ring network of the prior art.

FIG. 1 schematically depicts a so-called "one-on-one" optical WDM ring network, in which one full wavelength channel is dedicated to each origin-destination node pair and ten lasers are required. For pedagogical purposes, the ring depicted has been limited to only five nodes 10.1-10.5, interconnected by five bidirectional links. Each link has been depicted as subdivided into three sublinks, each corresponding to one full wavelength channel on the link. In the figure, the shading of each sublink indicates the corresponding wavelength channel.

Thus, sublink 20.1 connects node 10.1 to node 10.2, and each of sublinks 20.2-20.5 similarly connects one adjacent pair of nodes. Sublinks 30.1A and 30.1 B correspond to the same wavelength channel and connect node 10.1 to node 10.3. Similarly, each sublink pair 30.2A/30.2B to 30.5A/30.5B corresponds to a single wavelength channel and connects one pair of non-adjacent nodes.

Although useful, an arrangement such as that depicted in FIG. 1 has certain inefficiencies because a full wavelength channel must be assigned to every origin-destination pair, including those whose demands never add up to more than a small fraction of the capacity of the assigned channel. As a consequence, the cost of the network is driven up by underutilized components, such as light sources, e.g., lasers, and optical add-drop elements, that support the underutilized wavelength channels. Although greater efficiency can be achieved by reusing wavelengths, exemplarily by applying electrical-grooming techniques, these techniques generally require conversion from the optical to the electrical domain and back, at least at some nodes, which adds to the equipment costs.

Figure 2:
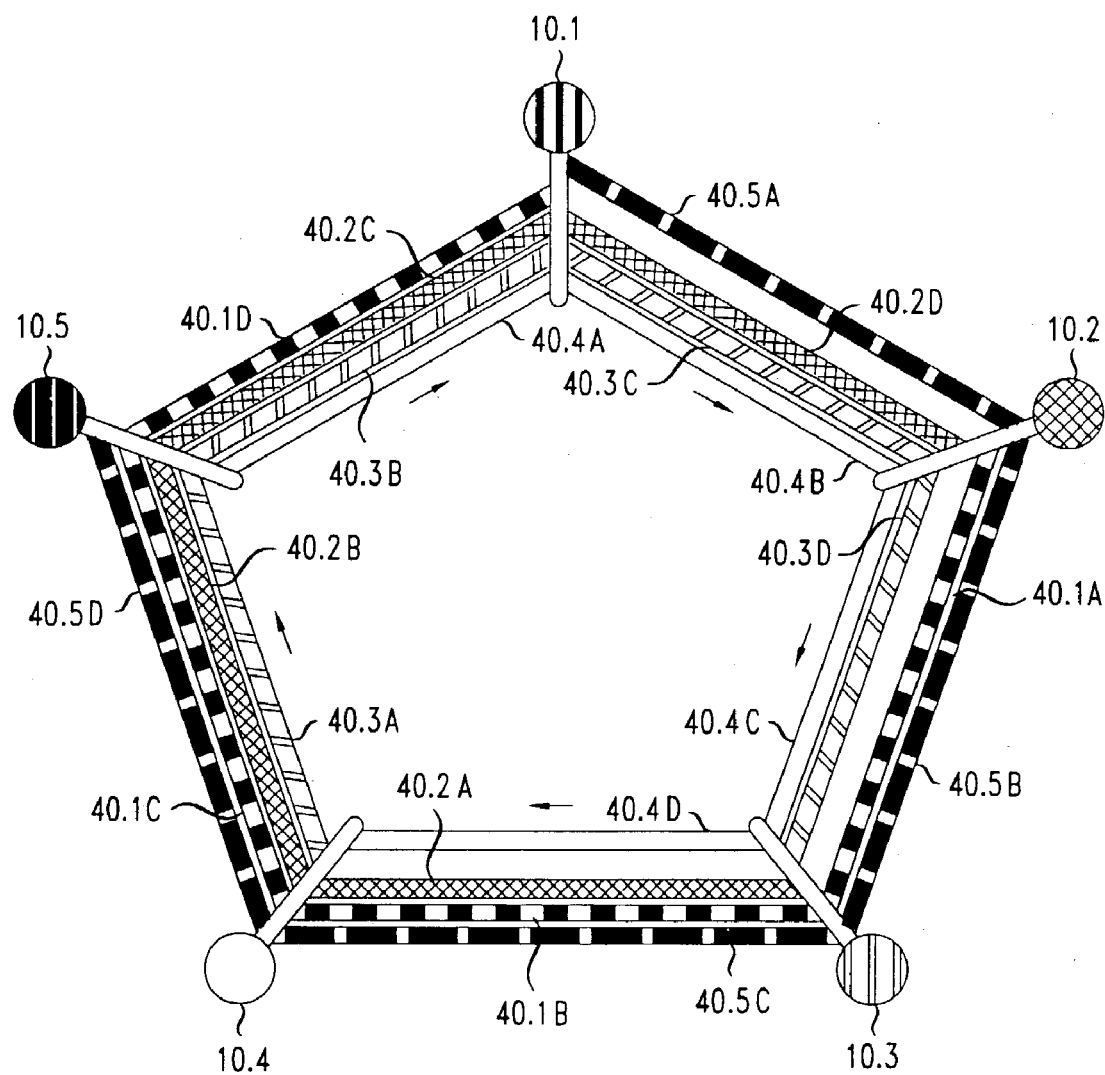
FIG. 2 is a conceptual drawing of a WDM ring network which illustrates certain basic concepts of TWIN.

By contrast, FIG. 2 depicts a similar ring in which a simple example of TWIN has been implemented. The nodes in FIG. 2 have been given the same reference numerals as in the previous figure. In contrast to the bidirectional links of FIG. 1, the links of FIG. 2 are shown for simplicity as unidirectional links. As depicted in the figure, each link is subdivided into four sublinks, each shaded to indicate a corresponding wavelength channel. Each destination node is associated with one of the wavelength channels, as also indicated by shading in the figure.

As shown in the figure, all transmissions to node 10.1 use part or all of the path consisting of sublinks 40.1 A-40.1D. Similarly, transmissions to node 10.2 use sublinks 40.2A-D; to node 10.3, sublinks 40.3A-D; to node 10.4, sublinks 40.4A-D; and to node 10.5, sublinks 40.5A-D.

Upon inspection of FIG. 1, it will be apparent that the total number of wavelength channels used in the ring depicted there is ten: five for connecting adjacent nodes, and five for connecting non-adjacent nodes. If fixed wavelength lasers are used as light sources at the nodes, twenty such lasers are needed; i.e., ten in each direction. By contrast, the ring of FIG. 2 uses only five wavelength channels: one for each destination node. Five tuneable lasers will suffice as light sources for the ring of FIG. 2.

Figure 3:
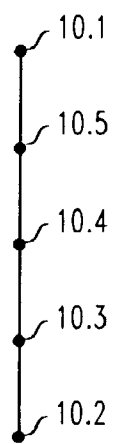
FIG. 3 is a tree graph corresponding to node 10.1 of FIG. 2.

FIG. 3 represents the tree for node 10.1 of FIG. 2. The destination, i.e. node 10.1, is situated at the root of the tree, which is here represented at the top of the figure. Transmissions from each of the other nodes to node 10.1 proceed upward (as seen in the figure) through the sequence of nodes (and of course through the sequence of interconnecting links) shown in the figure. There is a similar tree for each of the other nodes.

Figure 4:
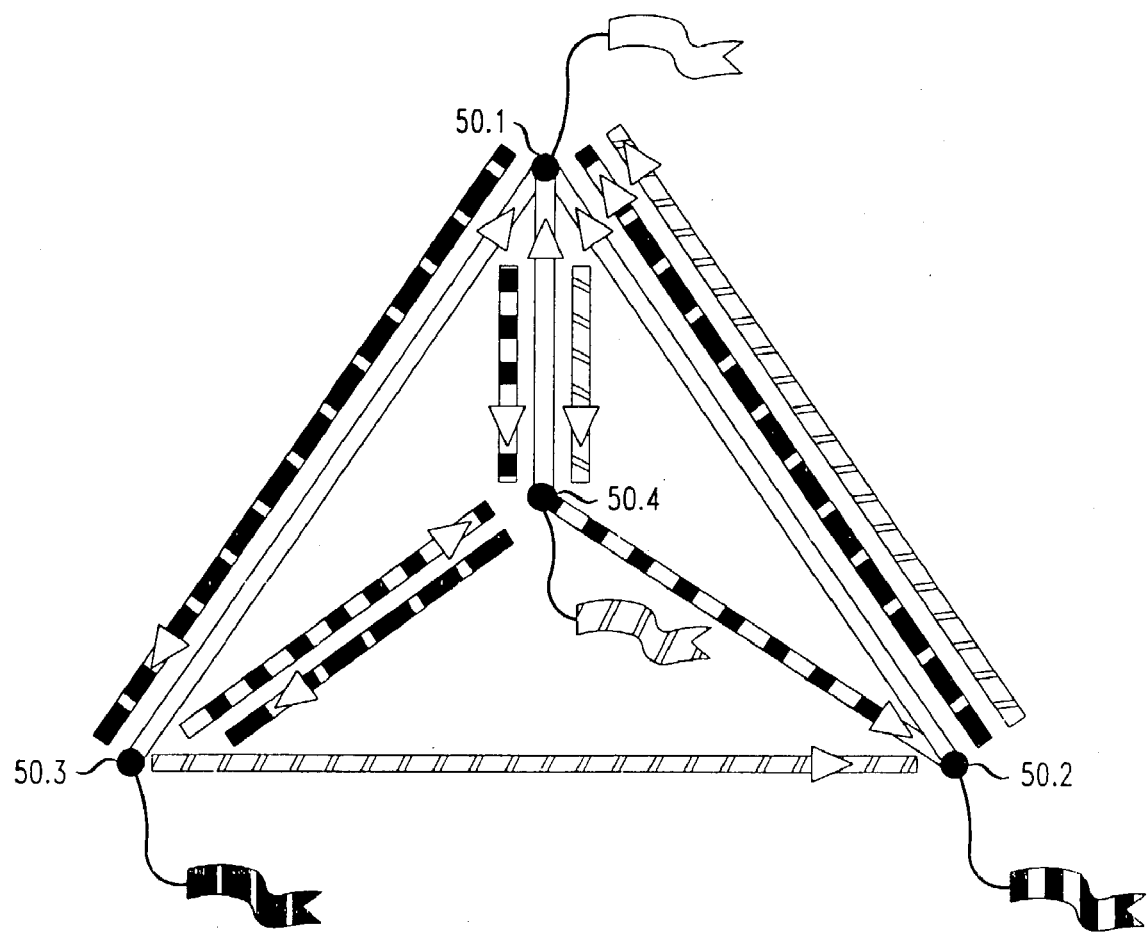
FIG. 4 is a conceptual drawing of a WDM mesh network configured according to an exemplary implementation of TWIN.

As noted above, TWIN is not limited to ring networks, but instead applies to optical networks generally. By way of further illustration, FIG. 4 depicts a simplified optical mesh network that is not a ring network. As seen in the figure, the network depicted there has three nodes 50.1-50.3 situated, for purposes of illustration, at the vertices of a triangle, and a fourth node 50.4 situated at the center of the triangle. In accordance with basic concepts of TWIN, each of the four nodes has an assigned wavelength channel, indicated in the figure by the shading of a pennant shown as tethered to the pertinent node.

A routing scheme for the network of FIG. 4 has been devised which is intended solely to be illustrative of various possible destination-based tree graphs. It was devised without regard to any considerations of optimality or, indeed, of practicality. The routing scheme is indicated in the figure by the subdivision of each link into one, two, or three sublinks, each shaded to correspond to a wavelength channel.

Figure 5A:
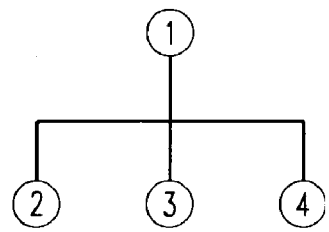
FIGS. 5A-5D are tree graphs corresponding to respective nodes of FIG. 4.
Figure 5B:
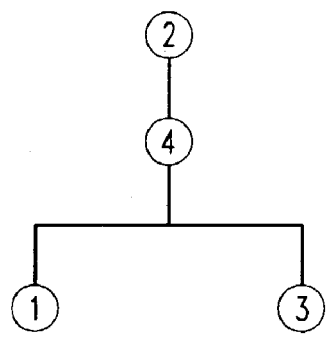
Figure 5C:
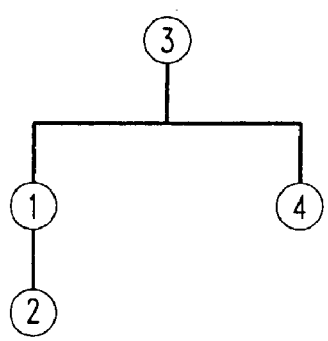
Figure 5D:

Upon inspection of the figure, it will be seen that each of nodes 50.2-50.4 transmits directly to node 50.1. This arrangement is diagrammed in the tree of FIG. 5A. Upon further inspection of FIG. 4, it will be seen that node 50.4 transmits directly to node 50.2, but each of nodes 50.1 and 50.3 transmits to node 50.2 only through node 50.4. This arrangement is diagrammed in the tree of FIG. 5B. Upon yet further inspection of FIG. 4, it will be seen that each of nodes 50.1 and 50.4 transmits directly to node 50.3, but node 50.2 transmits to node 50.3 only via node 50.1. This arrangement is diagrammed in the tree of FIG. 5C. Turning to FIG. 4 one last time, it will be seen that nodes 10.1-10.3 transmit to node 10.4 according to the sequence 10.3 to 10.2 to 10.1 to 10.4. This arrangement is diagrammed in FIG. 5D.

In general, many different trees will be possible for each destination node of a given network. Various algorithms are available to aid the network designer in choosing appropriate trees. In particular, algorithms are available that will readily identify the minimum spanning tree or a shortest path tree for any given destination node of any given network. The trees may also be designed with redundancy to take into account of possible network failures.

As noted above, it is advantageous to implement the trees by installing wavelength selective cross connects (WSCCs) at some or all of the nodes to allow reconfiguration. It is also advantageous for these WSCCs to perform the further function of merging common input wavelengths onto a common output fiber. Significant cost advantages are achieved if the WSCCs are implemented using 1×K wavelength-selective switches.

FIG. 6 is a simplified schematic diagram of a WSCC with merging. As seen in the figure, the WSCC has K input ports 60.1-60.K, wherein K is a positive integer. At each of the input ports, signals may arrive from various origin nodes, and in various wavelength channels. As illustrated in the figure, all of the arriving signals from all of the K input nodes are first combined in passive combiner 70.

From passive combiner 70, the combined signals are output on waveguiding medium 80, which delivers them to wavelength-selective switch 90, which is shown here as 1×K, although it should be noted that the number of outputs need not necessarily equal the number K of input ports. Wavelength-selective switch 90 has K output ports 100.1-100.K, wherein K is a positive integer, and can independently route every input wavelength channel to the appropriate output port. The stream of signals leaving each of these output ports will in general include signals from various origin nodes, but all signals leaving a given output port will lie in a single wavelength channel or, more generally, in a set of wavelength channels disjoint from similar sets associated with the other output ports. Thus, arriving signals in each wavelength channel are merged into a stream of signals exiting a single output port corresponding to that wavelength channel.

In some cases, for example when economic factors dictate that one or more wavelengths should be reused at multiple destinations, it will be advantageous to merge only partially; i.e., to merge some, but not all, signals of a given wavelength into a single output port.

Figure 7:
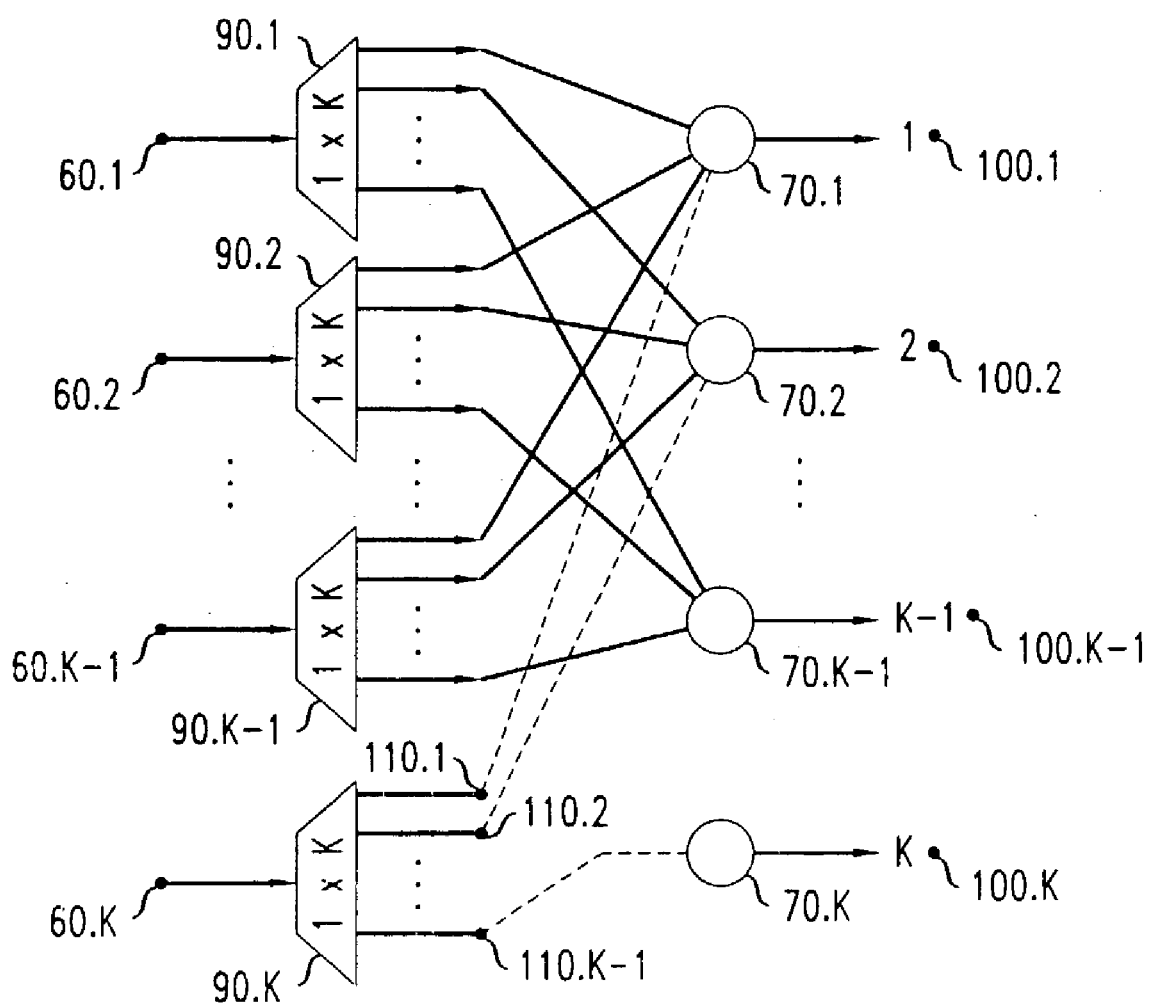
FIG. 7 is a schematic drawing of an illustrative wavelength-selective cross-connect (WSCC) with partial merging of wavelengths.

FIG. 7 is a simplified schematic diagram of a WSCC with partial merging. Shown in the figure are K input ports 60.1-60.K and K output ports 100.1-100.K. As will be explained below, there may be additional input and output ports, not shown in the figure. Relative to the arrangement of FIG. 6, the positions of passive combiner 70 and wavelength-selective switch 90 are reversed. As a consequence, instead of a single wavelength-selective switch, there is now one wavelength-selective switch for each input port. Accordingly, there are shown in the figure K wavelength-selective switches 90.1-90.K. Similarly, instead of a single passive combiner, there is now one passive combiner corresponding to each output port. As shown in the figure, there are K passive combiners 70.1-70.K.

As shown in FIG. 7, the input stream from a given input port 60.k (k=1, ..., K) is divided according to wavelength into K−1 separate streams by wavelength-selective switch 90.k. In the exemplary arrangement shown in the figure, streams corresponding to a given wavelength, e.g., the j'th wavelength (j=1, ..., K−1), that leave switches 90.1-90.K−1 are directed to passive combiner 70.j, which merges them and directs them to output port 100.j.

As seen in the figure, the same is true of some single-wavelength streams leaving switch 90.K. However, the stream leaving output port 110.K−1, which corresponds to the K−1'th wavelength channel, is not merged into passive combiner 70.K−1, but is instead merged into passive combiner 70.K. Also merged into passive combiner 70.K may be output streams in the K−1'th channel from other input ports and wavelength-selective switches not explicitly shown in the figure. It will be appreciated that in a practical WSCC with partial merging, there may be more than one wavelength channel that is subject to reuse in the same manner as illustrated in FIG. 7 for the K−1'th channel. For each such reused channel, there will be one or more combinations of a wavelength-selective switch and a passive combiner that function analogously to switch 90.K and combiner 70.K of the figure.

The technology for implementation of passive optical combiners is well known and need not be discussed here in detail. Wavelength-selective switches based on MEMS micro-mirrors, have been demonstrated and are described, e.g., in D. M. Marom et al., "Wavelength-Selective 1×4 Switch for 128 WDM Channels at 50 GHz Spacing," Post-Deadline PaperFB7, Optical Fiber Conference OFC2002, Los Angeles, 2002.

Figure 8:
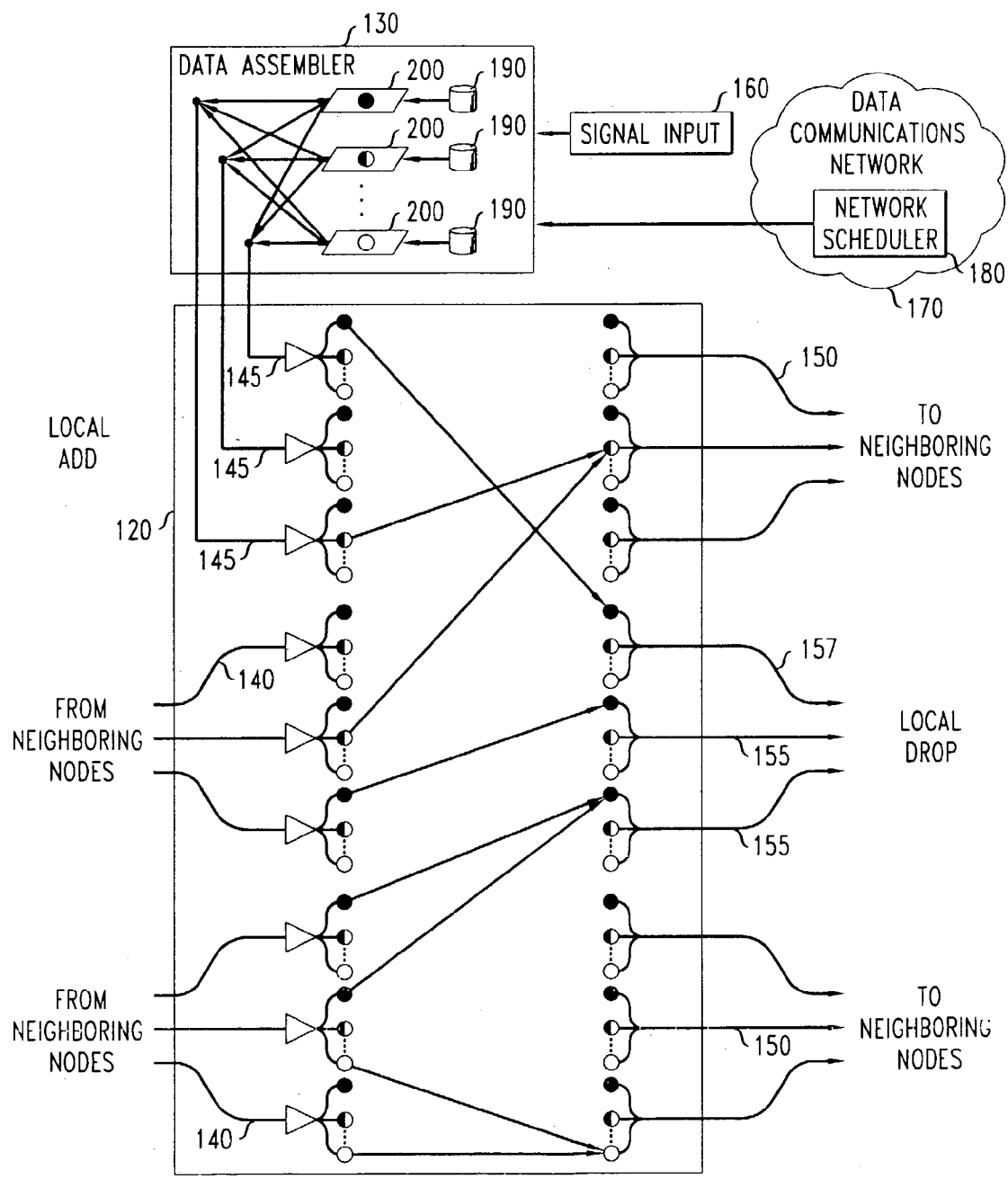
FIG. 8 is a schematic, functional diagram of a node of an illustrative WDM mesh network configured according to an exemplary implementation of TWIN.

FIG. 8 is a schematic, functional diagram of a node including WSCC 120 and data assembler 130. The function of the data assembler is to convert an input signal stream from signal source 160, which typically provides signal input in the electrical domain, to appropriately timed sequences of optical bursts distributed over multiple wavelength channels according to the respective destinations, and in at least some cases distributed over local input fibers 145 to WSCC 120. It should be noted by way of example but without limitation, that the signal input from source 160 may have a synchronous or an asynchronous format. Exemplary synchronous formats are DS-1, STS-1, and STS-3. Exemplary asynchronous formats are IP, ATM, FR, Ethernet, and SANs.

In the figure, data assembler 130 has been shown as including a respective buffer 190 for each of the wavelength channels. In the figure, three illustrative wavelengths are denoted, respectively, by a filled circle, a half-filled circle, and an open circle. Each buffer 190 is shown as providing signal input to a respective laser transmitter 200. The output of each laser transmitter 200, in turn, is shown as optically coupled to the local input fibers 145 of the WSCC.

In regard to the laser transmitters 200, it should be noted that when feasible, it will generally be preferable to use a single tunable laser instead of a bank of fixed-wavelength lasers. Accordingly, it should be understood that the light source is depicted in the figure as a bank of lasers purely for illustrative purposes, and not as an indication of any preferred embodiment it should also be noted that when fixed-wavelength lasers are in fact used, they will not be operated continuously, but rather operated intermittently. That is, the laser will be on when a burst of the corresponding wavelength is to be transmitted, and off otherwise.

For purposes of illustration, WSCC 120 is shown as having three local input fibers 145, and six input fibers 140 from neighboring nodes. Also for purposes of illustration, WSCC is shown as having six output fibers 150 to neighboring nodes, and three local drop fibers 155, 157.

The signal light sources are preferably fast-tunable lasers, so that the total number of laser transmitters can be significantly reduced. (A laser is considered "fast-tunable" in this context if it has a switching time less than 100 ns.) For example, the three fixed lasers 200 can be replaced with only one fast-tunable laser. Fast-tunable lasers useful in the context of the present invention and capable of switching from one wavelength to another in sub-nanoseconds are commercially available.

In at least some embodiments of the invention, it will be advantageous to distribute timing information, and other control information, to the nodes over a separate network 170, which is here referred to as the Data Communications Network (DCN). One component that makes use of DCN 170 is network scheduler 180. The function of the network scheduler is to assign timeslots for the optical bursts in each wavelength channel from each source node. The timing must be arranged so as to avoid collisions; i.e., to prevent bursts from distinct sources but in a common wavelength channel from overlapping on arrival at the destination node.

As will be seen, the complexity of collision-avoidance is reduced significantly by using tree graphs as described above. In particular, the use of trees ensures that if no collision occurs at the destination, no collision will occur at any prior point. This follows from the fact that if two bursts do collide at an intermediate node, they will thereafter coincide all the way to the destination.

Generally, the network scheduler will take into account the delay times between each of the source-destination node pairs. One useful approach to solving the timing problem is described below.

Turning again to WSCC 120, it will be noted that as drawn in the figure, each input fiber and output fiber of the WSCC fans out within the WSCC to an array of wavelength symbols, three of which appear explicitly as a filled, a half-filled, and an open circle as described above. Each of these symbols represents a wavelength that can be connected across the WSCC from an input fiber to an output fiber. A few illustrative cross connections are represented in the figure by arrows, each of which extends from an input-side wavelength symbol to a matching output-side wavelength symbol. These cross connections will typically be reprogrammable, on a relatively long timescale characteristic of network maintenance operations, in response to signals sent over DCN 170.

The merging function is achieved by directing incoming signals of a given common wavelength to a common output port. Typically, such signals will be output on a common outgoing fiber.

The node represented in the figure is the node whose assigned wavelength channel is symbolized by a filled circle. For that reason, the figure shows four incoming signals in that channel being connected to "local drop" output fibers. It will be noted that the signal directed to output fiber 157 is a locally generated signal. Such a signal may be used for control, rather than for communication, purposes.

At each source node, an aggregation function may be carried out within data assembler 130. That is, the incoming traffic flows enter in the form of IP packets, ATM cells, MLPS frames, or the like. These units of information from a given client are here referred to generically as "client Protocol Data Units (PDUs)." A group of PDUs for a given destination, from multiple clients, may be aggregated into a single optical burst. At the destination node, after the received optical signal is demodulated, each such burst must be decapsulated into the individual client PDUs for forwarding to the respective clients' ports. It should be noted in this regard that separate aggregation functions may be needed for synchronous and asynchronous signals, respectively.

Not shown in FIG. 8 is a receiver for detecting the locally dropped optical signals. At each node, such a receiver will be required to detect bursts arriving from various transmitters that are clocked a synchronously, and to perform frequency and phase synchronization on a burst-by-burst basis so that receipt of signals on different wavelengths can be distinguished and time-separated. Receivers suitable for this purpose are known, and are referred to in the art as "burst-mode receivers." Such a receiver is described, for example, in S. Rubin et al., "Implementation of ultrafast widely-tunable burst-mode 10 Gbit/s transceiver," *Electronics Letters* 38 (November 2002) 1462-1463.

One useful way to facilitate synchronization is via a preamble field that is prepended to each optical burst. This enables a synchronizer in the receiver to lock to the transmitter's bit stream for each burst. A start-of-burst delimiter field, which is also prepended to the optical burst, will be effective for delineating the burst, once bit synchronization has been achieved.

A practical lower limit to the length of a burst is imposed by the lack of a common timing between different nodes. In preferred embodiments, each node derives its time-of-day timing from a GPS, which will typically have uncertainty of 100 ns or less. To allow for such uncertainty, two adjacent bursts will generally be separated by a guard time interval of the same order as the uncertainty. The length of a burst, then, should be much longer than the guard time interval to achieve good efficiency. On the other hand, the length of a burst should not be so long that the packetization delay is increased significantly. We have found that burst lengths in the range of several to tens of microseconds provide a good tradeoff using currently available technology.

By way of example, the format for the optical bursts may advantageously conform, with some modification, to the GFP specification described in the standards document ITU-T Rec. G.7041, "Generic Framing Procedure (GFP)," December 2001. One useful modification will be to extend the GFP payload length field, so that a longer payload can be accommodated. Another useful modification will be to add a PDU length field, so that each client PDU can be delineated within the payload. Yet another useful modification will be to add a preamble and a start-of-burst delimiter.

In an exemplary scheme for organizing the transmissions of optical bursts, each burst is carried by one timeslot. Accordingly, the total duration of one timeslot is the sum of the payload duration, a guard time, and an overhead duration. Typical timeslot durations are 2-20 microseconds are suitable when the optical channel rate is 10 Gbps and the stream of the smallest granularity is roughly 50 Mbps. A number of timeslots, typically 150-200, are packed into a repetitive cycle.

The scheduling function operates to assign slots to origin-destination pairs such that collisions are avoided, slot utilization is maximized, and preferable, at least some minimum transmission rate is assured for each origin-destination pair. In exemplary embodiments of the invention, a distributed scheduler (DS) supports asynchronous traffic, and a centralized scheduler (CS) supports synchronous traffic. To avoid contention by the DS and CS for the same slots, each cycle is advantageously subdivided into two periods—one for transmission of each class of traffic.

Advantageously, each DS is associated with a given destination and performs scheduling among those origin nodes that have information to be sent to that destination. The DS examines a bandwidth request sent by a source and in response grants selected slots in subsequent cycles. The request and grant messages are transmitted in-band, i.e., in the same optical channel as the data channel rather than over the DCN, so that this information is exchanged quickly enough to accommodate changes in the requests.

The CS schedules the burst transmission of synchronous traffic in which the client PDUs arrive periodically, and for which the bandwidth of a connection is relatively constant. Accordingly, the CS can gather and process the pertinent information, such as the traffic demand matrix, over a relatively long time scale, e.g. on the order of seconds. Consequently, the CS can run a very effective algorithm for computing desirable slot allocations for the origin-destination pairs. One such algorithm is described below. Significantly, the scheduler must take into consideration the propagation delays between the various node pairs.

A scheduling algorithm of current interest is based on a relationship between the problem of avoiding collisions between bursts and the graph-theoretical concept of independent sets. In graph theory, an independent set of vertices contains no neighboring pair of vertices; i.e., no pair of vertices connected by one edge. Graph theory is applied to the scheduling problem by assigning a vertex (i,j) to every possible transmission, in a given timeslot, from some node i to some node j.

Two vertices (i,j), (i',j') of the resulting graph are neighbors if they satisfy a neighborhood condition. If transmission is instantaneous, or if the transmission delays $d_{ij}$ from node i to node j are equal for all i and j, then the neighborhood condition is satisfied if i=i' or if j=j'. (Unless stated otherwise, "or" is inclusive.) Equality of i and i' is treated as a forbidden collision because each origin node may transmit to no more than one destination node per timeslot. Equality of j and j' (for i≠i') implies a collision in the sense that transmissions from distinct origins arrive at a common destination in the same timeslot.

If $d_{ij}$ differs for different (i,j), the neighborhood condition is more complicated. We introduce a timeslot index k, k=1, ..., T. wherein T is large enough to schedule most or all of the currently specified traffic demands $W_{ij}$. If a transmission from i to j is initiated in timeslot k, the corresponding vertex is now indexed (i,j,k).

For i≠i', vertices (i,j,k) and (i',j',k') now satisfy the neighborhood condition if they have a common destination (j=j') and the burst sent from i in timeslot k arrives at j concurrently with the burst sent from i' in timeslot k' (k+$d_{ij}$=k'+$d_{i'j}$). As explained above, a pair of vertices will also satisfy the neighborhood condition if they have a common origin (i=i') and common initial timeslot (k=k').

For purposes of the algorithm to be described below, we also introduce a vertex property that we refer to as feasibility. A vertex (i,j,k) is feasible if no burst has yet been scheduled for transmission from node i in timeslot k, or no burst destined for node j has yet been scheduled so as to arrive in timeslot k+$d_{ij}$. The second alternative condition means that no transmission (i',j,k') has been scheduled for which k'=k+$d_{ij}$−$d_{i'j}$.

Thus, the feasibility indicator for node pair (i,j) at time k takes unity value if a burst can be scheduled in timeslot k without fear of a prohibited collision. Otherwise, the feasibility indicator takes zero value. The feasibility indicator is used to substantially prevent prohibited collisions. In this context, "substantial prevention" means prevention of all collisions, except those that occur due to inaccuracies in timing or in the measurement of delays.

It will be understood that in adding delays to timeslot indices, each delay $d_{ij}$ is rounded to the next higher full timeslot unit.

An independent set of transmissions can be sent in concert within a single timeslot because, by definition, independent transmissions will not collide at the origin or at the destination. The algorithm to be described seeks a tradeoff between two desirable goals: to find, for each successive timeslot, the largest possible independent set of the yet-unscheduled demands, and to favor those node pairs between which there remain the greatest unscheduled demands.

To achieve the desired tradeoff, the algorithm refers to a quantity that we here denote the Normalized Weight (NW). The NW of a node pair (i,j) at time k is the unscheduled demand $D_{ij}$ between that pair, divided by a sum of unscheduled demands for node pairs in the neighborhood at time k of node pair (i,j).

Importantly, this summation is carried out over time as well as over node pairs. Thus, at each timeslot k', those and only those node pairs (i',j') are counted which are neighbors of (i,j) and for which (as a further, not an alternative requirement) the vertex (i',j',k') satisfies the feasibility condition. (In this regard, (i,j) is considered a member of its own neighborhood.)

The NW is represented by the following equation:

$$NW_{ij}(k) = \frac{f_{ij}(k) \cdot D_{ij}}{\sum_{i'j'k'} D_{i'j'} \cdot f_{i'j'}(k')},$$

where the summation is carried out only over vertices in the neighborhood of (i,j,k), and $f_{i'j'}(k')$ equals 1 if (i',j',k') is feasible, zero otherwise.

In accordance with our scheduling algorithm, we first seek, for k∈{1..., T}, that feasible vertex (i*,j*,k*) having the greatest NW. We schedule (i*,j*,k*) and decrement $D_{i*j*}$ by one unit. We repeat the same procedure until all demands have been scheduled or until none of the remaining vertices are feasible.

In a practical network, it is advantageous to include a protection scheme for maintaining connections between node pairs in the face of link failures or other faults. We have devised a protection scheme, to be described below, that is simple to implement. It would be expected that implementation of a protection scheme would detract somewhat from network performance. However, numerical simulations based on realistic traffic modeling have shown that the performance penalty associated with our scheme is relatively small, in general.

In accordance with our protection scheme, every node pair is assigned two paths, a primary path to be used in normal operation, and a backup path to switch to when a failure is detected. The set of backup paths to each destination node will constitute a backup tree associated with that node. Although the present discussion assumes that protection is afforded to all node pairs, it will be appreciated that similar arguments apply when only a subset of the node pairs are to be protected.

As with the primary trees, any of various known algorithms are readily used to generate the backup trees. In general, it will be most advantageous to make each backup path disjoint from the corresponding primary path, so that, at least for simple faults, only one of the two paths can fail at a time.

The scheduling algorithm, such as the one described above, is performed so as to schedule for both the primary and the backup paths. This is achieved by replacing each node pair (i,j) with two node pairs ($i^p,j^p$) and ($i^b,j^b$), each having a respective delay $\delta_{ij}^p, \delta_{ij}^b$. (Typically, the primary delay will be the smaller delay.)

In performing the scheduling algorithm, the prohibitions against collisions apply to the backup node pairs in the same manner as to the primary node pairs. However, these prohibitions are not applied between a primary path and its corresponding backup path.

In normal network operation, all demand will be carried on primary paths, and thus there will be zero demand to be scheduled between backup node pairs. When affected node pairs detect a failure, all demand between those pairs will be switched to the backup paths, and scheduled accordingly.

What is claimed is:

1. A method of optical communication, comprising:
   a) generating a plurality of optical signals, each optical signal having a specified duration and a specified wavelength; and
   b) passively transporting each optical signal from an origination node of a network to a destination node determined by the signal wavelength; wherein:
   c) the network includes at least one branch point having two or more output branches;
   d) for at least one of the signals of said plurality, the passive transport of that signal to its destination node comprises transporting the signal out of at least one branch point of the network through an output branch determined by the signal wavelength;
   e) the generating and transporting of optical signals are carried out such that at least two distinct optical signals having distinct signal wavelengths are transmitted from a common origination node to different destination nodes;
   f) the plurality of optical signals is generated according to a schedule; and
   g) the schedule is devised to substantially prevent collisions, a collision being the concurrent arrival, at the same destination node, of signals having the same wavelength but coming from different origination nodes.

2. The method of claim 1, wherein at least at one branch point, all outgoing signals of said plurality that have the same wavelength are merged onto a common outgoing optical fiber.

3. The method of claim 1, wherein:
   at least at one branch point having two or more input ports, all outgoing signals of said plurality that have the same wavelength are merged onto a common outgoing optical fiber;
   at least one further optical signal having a specified wavelength enters the branch point via an input port and is passively directed onto an outgoing optical fiber; and
   said wavelength and said input port conjointly determine the selection of outgoing optical fiber for said further optical signal.

4. The method of claim 1, wherein the passive transport is carried out such that each optical signal traverses a path through a topological tree associated with the pertinent signal wavelength, a propagation delay is associated with each said path, and the schedule is devised taking said delays into account to prevent collisions.

5. The method of claim 4, wherein the schedule is further devised to take into account amounts of unscheduled demand between respective origin and destination node pairs.

6. The method of claim 5, wherein the schedule is further devised to achieve a favorable balance between maximizing the number of concurrent transmissions that will arrive at their respective destination nodes without collisions, and minimizing the accumulation of unscheduled demand at the respective origin nodes.

* * * * *